Sept. 17, 1957  B. ROBERTS  2,806,318
FISH LURE
Filed Aug. 16, 1956
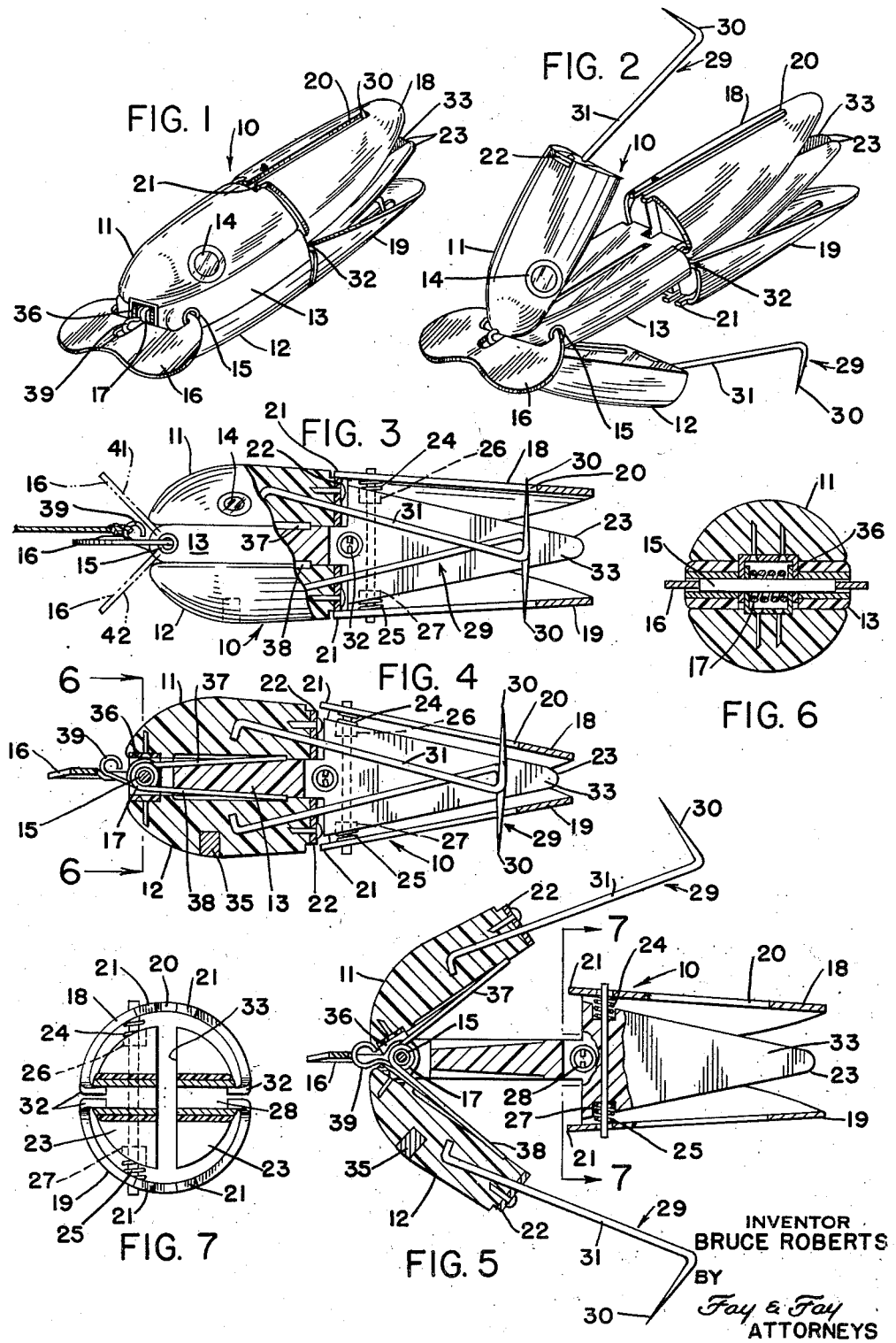
INVENTOR
BRUCE ROBERTS
BY
Fay & Fay
ATTORNEYS

United States Patent Office 2,806,318
Patented Sept. 17, 1957

2,806,318

FISH LURE

Bruce Roberts, Painesville, Ohio, assignor to Upson Development Corporation, a corporation of Ohio Application August 16, 1956, Serial No. 604,354

2 Claims. (Cl. 43—35)

This invention, relating as indicated to a fish lure, comprises trigger bars and a pair of unbarbed snatch hooks, together with operating means for the snatch hooks.

In general, in connection with fish lures the character of the body structure may be of any particular shape, and a number of lures have been devised with hooks resiliently urged in an outwardly direction to catch a fish, and these are triggered in various manners by the action of the fish in closing upon the lure. In connection with many of these fish lures, the trigger bar has been somewhat insensitive and has not been sufficiently sensitive to be triggered under all conditions. This new and improved lure is directed to a pair of unbarbed hooks adapted to move outwardly with a trigger bar both on the top and the bottom, interconnected but capable of independent movement to permit the release of one or more of the hooks and in the process of release of one hook to release the other hook under all normal conditions of usage.

An object of this invention is to produce a new and improved version of a fish lure having a pair of snatch hooks adapted to move outwardly, said snatch hooks being unbarbed and resiliently held in the outward position.

A further object of this invention is to devise a new and improved fish lure having unbarbed snatch hooks with a simplified sensitive trigger mechanism together with operating means for closing the snatch hooks and releasing the fish for return to the water or to an enclosure.

To the accomplishment of the foregoing and related ends, said invention, then, consists of the fish lure and means hereinafter fully described and particularly pointed out in the claims; the following description setting forth in detail one approved means of carrying out the invention, such disclosed means, however, constituting but one of the various ways in which the principles of this invention may be used.

In the drawings:

Fig. 1 is a perspective view of the fish lure;

Fig. 2 is a perspective view of the fish lure in the open position showing the snatch hooks after they have moved out of the lure;

Fig. 3 is a transverse cross-sectional view through the lure showing the snatch hooks held within the lure and showing the trigger bar;

Fig. 4 is a further cross-sectional view through the lure showing the trigger bar in the inward position before the springs urge the snatch hooks outwardly;

Fig. 5 is a cross-sectional view of the lure in the extended position showing the upper and lower body portions and the center portion with the coil spring surrounding the pivot point within the center body portion;

Fig. 6 is a cross-sectional view along the line 6—6 of Fig. 4; and

Fig. 7 is a further cross-sectional view along the line 7—7 of Fig. 5 showing the opening in the tail portion for the snatch hooks and the slot within the trigger bars.

In the drawings, 10 shows a lure generally having an upper body portion 11, a lower body portion 12, a center body portion 13 and ornamentation and other features only partially illustrated, such as, for example, an eye 14. Within the center body portion is a pivot 15, and a vane 16 is pivoted on the pivot. A coil spring 17 surrounds the pivot and urges the upper and lower body portions apart. Connected to the center body portion is a tail portion 23, and connected to the center portion 13 are an upper and lower trigger bar 18 and 19. The upper trigger bar has a slot extending from the front portion of the trigger bar almost to the rear of the trigger bar at 20. The lower trigger bar has a similarly positioned slot. On the front portion of each of the trigger bars is a tang or double projection 21 which is adapted to move off a catch plate 22 when the trigger bars are urged inwardly as by the strike of a fish.

Each of the trigger bars is attached to the tail portion 23 by means of a spring means 24 for the upper trigger bar and 25 for the lower trigger bar moving in a well 26 and 27, with the trigger bars 18 and 19 pivoted at 28 rotating on ears turned in at 32 between the tail portion 23 and the upper trigger bar 18. Each of the trigger bars 18 and 19 is pivoted about the tail at 28, and a projection or tang portion 21 is adapted to move off the catch plate 22 when the bars are actuated towards the tail portion so that the resiliently urged snatch hooks move outwardly therefrom.

These hooks shown generally at 29 have a hook portion 30 and a stem portion 31 adapted to be molded within the plastic upper and lower body portions 11 and 12. Other means for attaching the stem of the hooks 29 to the lure may be used. The lower hook is identical with the upper hook except in the opposite position. Each of the hooks are adapted to move within a slot in the tail portion 23, the slot being shown at 33.

In connection with the hinge pivot 15, the upper body portion 11 is attached through the hinge to the lower body portion 12, and within the lower body portion there may be a weight 35. The hinge shown at 36, has a leg 37 extending from the coil spring 17 which is urged toward the upper body portion 11 and another leg 38 which is urged toward the lower body portion 12.

Attached to the hinged pivot is an eye piece 39 to which a leader may be fastened, and the vane 16 is adapted to pivot around the hinged pivot.

From the position shown in Fig. 3 a fish would actuate one or more of the trigger bars 18 and 19 which is adapted to move inwardly off the catch plate 22, as shown in Fig. 4, so that the coil spring 17 would move apart the upper and lower body portions, and the snatch hooks 29 would move outwardly within the well or slot 33 of the tail portion 23 and through the slots within the trigger bars. Meanwhile the springs shown at 24 and 25 would return the trigger bars to their original position.

To release the fish from the hooks, the upper and lower body portions are grabbed between the fingers with the leader in the opposite hand and the hooks returned within the tail portion through the slots in the trigger bars, and the fish would be dropped off the hooks.

In connection with the lure, a vane may be employed as shown at 16 which may be adjusted to an upper position 41 or to a lower position 42, and the current as the lure is being pulled through the water would cause the lure to either travel deep or rise to the surface as desired, depending upon which side of the eye piece the vane was positioned. In connection with the lure moving through grass, in the water or along the bottom, it can be seen that the lower body portion which is weighted would first strike any obstruction and because of the forward movement, the trigger bar would not be actuated, and in the event that it would be under certain conditions, the sensitivity can be adjusted within each of the springs so that each trigger bar may be as sensitive as desired. In the event that a fish strikes only one of the trigger bars, that trigger will move outwardly and because of the force or thrust of that trigger bar, the opposite trigger will often become released.

The advantages of this combination are that the fish may be removed from the hooks with considerable ease, and returning undersized fish to the water is greatly facilitated under the circumstances, with a much decreased mortality in the fish in the removal from the hook.

Although the present invention has been described in connection with a few preferred embodiments thereof, variations and modifications may be resorted to by those skilled in the art without departing from the principles of the invention. All of these variations and modifications are considered to be within the true spirit and scope of the present invention as disclosed in the foregoing description of the fish lure and defined by the appended claims.

I claim:

1. A fish lure comprising a body and a tail, said body comprising a central portion and two outer portions pivotally connected together to said central portion, a spring element on said central portion biasing said outer portions outwardly, a snatch hook secured to each of said outer portions and extending towards said tail portion, said tail portion having an elongated slot therein in which said hooks are housed, a leader connected to the central body portion, each of said outer body portions providing a finger grip portion to move said hooks against the bias of said spring from their outwardly extended position to their closed position within the elongated slot of said tail portion, a pair of trigger bars resiliently and pivotally attached to said tail portion adjacent the corresponding outer portion of said body, a catch plate secured to each of said outer body portions at one end thereof, each of said trigger bars having a tang portion adapted to fit over the corresponding catch plate for releasably holding said hooks in closed set position, whereby pivotal movement of said trigger bars causes said tang portions to be removed from their overlying position on said plates allowing said hooks to move outwardly for catching a fish.

2. The fish lure of claim 1 in which said trigger bars have elongated slots therein adapted to register with said slot in said tail to permit said hooks to pass through said trigger bars into said tail portion and outwardly therefrom.

References Cited in the file of this patent
UNITED STATES PATENTS 1,464,387    Kishpaugh _____ Aug. 7, 1923

FOREIGN PATENTS 77,507    Norway _____ Aug. 20, 1951